(12) United States Patent
Glenn et al.

(10) Patent No.: US 7,989,524 B2
(45) Date of Patent: Aug. 2, 2011

(54) FIBER-REINFORCED STARCH-BASED COMPOSITIONS AND METHODS OF MANUFACTURE AND USE

(75) Inventors: Gregory M. Glenn, American Canyon, CA (US); Simon K. Hodson, Santa Barbara, CA (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 279 days.

(21) Appl. No.: 11/184,128

(22) Filed: Jul. 19, 2005

(65) Prior Publication Data

US 2007/0021534 A1    Jan. 25, 2007

(51) Int. Cl.
| | |
|---|---|
| C08L 3/00 | (2006.01) |
| C08L 89/00 | (2006.01) |
| D21H 19/54 | (2006.01) |
| C09D 103/00 | (2006.01) |
| C09D 189/00 | (2006.01) |
| C09J 103/00 | (2006.01) |
| C09J 189/00 | (2006.01) |

(52) U.S. Cl. ............... 524/47; 106/145.1; 106/206.1
(58) Field of Classification Search .......... 524/47; 106/145.1, 206.1
See application file for complete search history.

(56) References Cited

U.S. PATENT DOCUMENTS

| | | | | |
|---|---|---|---|---|
| 3,293,737 A * | 12/1966 | Falkenau et. al. | ............ | 29/423 |
| 3,850,863 A | 11/1974 | Clendinning et al. | ......... | 260/7.5 |
| 3,867,324 A | 2/1975 | Clendinning et al. | ...... | 260/23 H |
| 3,949,145 A | 4/1976 | Otey et al. | ................. | 428/423 |
| 4,076,846 A | 2/1978 | Nakatsuka et al. | ............ | 426/62 |
| 4,133,784 A | 1/1979 | Otey et al. | .................. | 260/17.4 |
| 4,337,181 A | 6/1982 | Otey et al. | .................. | 523/128 |
| 4,454,268 A | 6/1984 | Otey et al. | ...................... | 524/47 |
| 4,482,386 A | 11/1984 | Wittwer et al. | ............... | 106/135 |
| 4,655,840 A | 4/1987 | Wittwer et al. | ............... | 106/126 |
| 4,673,438 A | 6/1987 | Wittwer et al. | ............... | 106/126 |
| 4,863,655 A | 9/1989 | Lacourse et al. | ............... | 264/53 |
| 4,900,361 A * | 2/1990 | Sachetto et al. | ........... | 106/210.1 |
| 4,992,100 A * | 2/1991 | Koepff et al. | ............. | 106/160.1 |

(Continued)

OTHER PUBLICATIONS

A Maltose Biosensor for Determining Gelatinized Starch in Processed Cereal Foods; Emanuele Marconi, Maria Cristina Messia, Guiseppe Palleschi, and Raimondo Cubadda; 2004 American Association of Cereal Chemists, Inc.

Primary Examiner — Mark Eashoo
Assistant Examiner — Liam J Heincer
(74) Attorney, Agent, or Firm — Elizabeth R. Sampson; John D. Fado; Lesley Shaw (57) ABSTRACT

A fiber-reinforced and starch-based composition can be prepared by combining two fractions. The first fraction can include a gelatinized starch, water, and fibers, wherein the fibers are substantially homogenously mixed with the starch in an amount sufficient to structurally reinforce the mechanical characteristics of the starch-based composition. The second fraction is then combined with the first fraction, wherein the second fraction can include non-gelatinized starch, non-volatile plasticizer, and a water-resistant polymer. The composition is mixed so as to form a thermoplastic composition being capable of expanding when rapidly heated to above the boiling point of water and the softening point of the plasticized starch. Additionally, fiber-reinforced articles can be prepared from a method of processing the starch-based compositions. Such a method includes introducing the fiber-reinforced starch-based composition into a mold, and molding the composition into a fiber-reinforced article.

4 Claims, 7 Drawing Sheets

U.S. PATENT DOCUMENTS

| | | | | |
|---|---|---|---|---|
| 5,095,054 | A | 3/1992 | Lay et al. | 524/47 |
| 5,110,838 | A | 5/1992 | Tokiwa et al. | 521/81 |
| 5,115,000 | A | 5/1992 | Jane et al. | 524/47 |
| 5,124,371 | A * | 6/1992 | Tokiwa et al. | 523/124 |
| 5,206,087 | A | 4/1993 | Tokiwa et al. | 428/403 |
| 5,208,267 | A | 5/1993 | Neumann et al. | 521/79 |
| 5,234,977 | A | 8/1993 | Bastioli et al. | 524/47 |
| 5,234,978 | A | 8/1993 | Delrue et al. | 524/53 |
| 5,244,474 | A * | 9/1993 | Lorcks et al. | 44/557 |
| 5,252,271 | A | 10/1993 | Jeffs | 264/54 |
| 5,256,711 | A | 10/1993 | Tokiwa et al. | 524/47 |
| 5,258,430 | A | 11/1993 | Bastioli et al. | 524/52 |
| 5,262,458 | A | 11/1993 | Bastioli et al. | 524/52 |
| 5,266,368 | A | 11/1993 | Miller | 428/35.6 |
| 5,275,774 | A | 1/1994 | Bahr et al. | 264/211 |
| 5,280,055 | A | 1/1994 | Tomka | 524/47 |
| 5,286,770 | A | 2/1994 | Bastioli et al. | 524/52 |
| 5,288,318 | A | 2/1994 | Mayer et al. | 106/213 |
| 5,288,765 | A | 2/1994 | Bastioli et al. | 521/84.1 |
| 5,292,782 | A | 3/1994 | Bastioli et al. | 524/47 |
| 5,308,879 | A | 5/1994 | Akamatu et al. | 521/84.1 |
| 5,314,754 | A | 5/1994 | Knight | 428/532 |
| 5,314,934 | A | 5/1994 | Tomka | 524/53 |
| 5,317,037 | A | 5/1994 | Golden et al. | 523/128 |
| 5,360,473 | A | 11/1994 | Fleche et al. | 106/210 |
| 5,360,830 | A | 11/1994 | Bastioli et al. | 521/84.1 |
| 5,362,777 | A | 11/1994 | Tomka | 524/47 |
| 5,367,067 | A | 11/1994 | Frische et al. | 536/45 |
| 5,377,860 | A * | 1/1995 | Littlejohn et al. | 220/790 |
| 5,382,611 | A | 1/1995 | Stepto et al. | 524/47 |
| 5,393,804 | A | 2/1995 | George et al. | 523/128 |
| 5,397,834 | A | 3/1995 | Jane et al. | 525/54.1 |
| 5,405,564 | A | 4/1995 | Stepto et al. | 264/115 |
| 5,412,005 | A | 5/1995 | Bastioli et al. | 524/47 |
| 5,415,827 | A | 5/1995 | Tomka et al. | 264/510 |
| 5,427,614 | A | 6/1995 | Wittwer et al. | 106/213 |
| 5,436,078 | A | 7/1995 | Bühler et al. | 428/474.4 |
| 5,444,107 | A * | 8/1995 | Ajioka et al. | 523/124 |
| 5,462,980 | A | 10/1995 | Bastioli et al. | 524/47 |
| 5,462,982 | A | 10/1995 | Bastioli et al. | 524/47 |
| 5,480,920 | A | 1/1996 | Schmid et al. | 524/47 |
| 5,512,090 | A | 4/1996 | Franke et al. | 106/154.1 |
| 5,512,378 | A | 4/1996 | Bastioli et al. | 428/484 |
| 5,525,281 | A | 6/1996 | Lörcks et al. | 264/101 |
| 5,552,461 | A * | 9/1996 | Redd et al. | 524/47 |
| 5,569,692 | A | 10/1996 | Bastioli et al. | 524/47 |
| 5,589,518 | A | 12/1996 | Bastioli et al. | 521/55 |
| 5,618,341 | A * | 4/1997 | Andersen et al. | 106/287.35 |
| 5,635,550 | A * | 6/1997 | Dehennau et al. | 524/47 |
| 5,663,216 | A | 9/1997 | Tomka | 523/128 |
| 5,679,145 | A * | 10/1997 | Andersen et al. | 106/162.5 |
| 5,705,536 | A | 1/1998 | Tomka | 521/84.1 |
| 5,770,137 | A | 6/1998 | Lörcks et al. | 264/109 |
| 5,773,495 | A * | 6/1998 | Haschke et al. | 524/52 |
| 5,844,023 | A | 12/1998 | Tomka | 524/47 |
| 5,874,486 | A | 2/1999 | Bastioli et al. | 523/128 |
| 5,897,944 | A | 4/1999 | Loercks et al. | 428/316.6 |
| 5,910,350 | A | 6/1999 | Loracks et al. | 428/71 |
| 5,910,520 | A * | 6/1999 | Dabi et al. | 523/128 |
| 5,916,645 | A * | 6/1999 | Stauderer et al. | 428/35.7 |
| 5,922,379 | A * | 7/1999 | Wang | 426/138 |
| 5,976,235 | A * | 11/1999 | Andersen et al. | 106/162.51 |
| 6,011,092 | A * | 1/2000 | Seppala et al. | 524/47 |
| 6,062,228 | A | 5/2000 | Loercks et al. | 131/332 |
| 6,096,809 | A | 8/2000 | Lorcks et al. | 524/47 |
| 6,117,925 | A | 9/2000 | Tomka | 524/47 |
| 6,136,097 | A | 10/2000 | Lörcks et al. | 127/32 |
| 6,214,907 | B1 | 4/2001 | Tomka | 524/47 |
| 6,218,321 | B1 | 4/2001 | Lorcks et al. | 442/165 |
| 6,231,970 | B1 | 5/2001 | Andersen et al. | 428/332 |
| 6,235,815 | B1 | 5/2001 | Loercks et al. | 524/47 |
| 6,235,816 | B1 | 5/2001 | Lorcks et al. | 524/47 |
| 6,242,102 | B1 | 6/2001 | Tomka | 428/451 |
| 6,277,899 | B1 | 8/2001 | Bastioli et al. | 523/128 |
| 6,348,524 | B2 | 2/2002 | Bastioli et al. | 524/47 |
| 6,406,530 | B1 * | 6/2002 | Bengs et al. | 106/137.1 |
| 6,472,497 | B2 | 10/2002 | Loercks et al. | 528/196 |
| 6,479,164 | B1 | 11/2002 | Lörcks et al. | 428/532 |
| 6,573,340 | B1 | 6/2003 | Khemani et al. | 525/437 |
| 6,586,031 | B1 * | 7/2003 | Kelly | 426/516 |
| 6,632,862 | B2 * | 10/2003 | Willett et al. | 524/13 |
| 6,709,526 | B1 * | 3/2004 | Bailey et al. | 127/29 |
| 6,723,264 | B1 * | 4/2004 | Bussey et al. | 264/53 |
| 6,802,895 | B2 * | 10/2004 | Mackey et al. | 106/206.1 |
| 6,962,950 | B1 * | 11/2005 | Bastioli et al. | 524/47 |
| 7,041,369 | B1 | 5/2006 | Mackey et al. | 428/373 |
| 2001/0039303 | A1 * | 11/2001 | Loercks et al. | 524/47 |
| 2002/0006989 | A1 * | 1/2002 | Bastioli et al. | 524/47 |
| 2002/0071947 | A1 * | 6/2002 | Soane et al. | 428/313.3 |
| 2003/0100635 | A1 | 5/2003 | Ho et al. | 524/47 |
| 2003/0109605 | A1 | 6/2003 | Bond et al. | 524/47 |
| 2003/0119949 | A1 | 6/2003 | Favis et al. | 524/47 |
| 2004/0009268 | A1 * | 1/2004 | Axelrod et al. | 426/132 |
| 2004/0122135 | A1 * | 6/2004 | Halley et al. | 524/47 |
| 2005/0008749 | A1 * | 1/2005 | Tak Lin et al. | 426/549 |
| 2006/0208387 | A1 * | 9/2006 | Zodl | 264/122 |
| 2006/0251791 | A1 * | 11/2006 | Rubio et al. | 426/622 |
| 2006/0258783 | A1 * | 11/2006 | Rettenbacher | 524/27 |
| 2006/0264539 | A1 * | 11/2006 | Mosseveld et al. | 524/47 |

* cited by examiner

FIBER-REINFORCED STARCH-BASED COMPOSITIONS AND METHODS OF MANUFACTURE AND USE

CROSS-REFERENCE TO RELATED APPLICATIONS

This United States patent application cross-references another United States patent application filed simultaneously herewith on Jul. 19, 2005, entitled "EXPANDABLE STARCH-BASED BEADS AND METHOD OF MANUFACTURING MOLDED ARTICLES THEREFROM" with Gregory M. Glenn and Simon K. Hodson as inventors, Express Mail Label No. EV565665480US, the disclosure of which is incorporation herein in its entirety.

BACKGROUND OF THE INVENTION

1. The Field of the Invention

The present invention relates generally to expandable starch-based compositions. More particularly, the present invention relates to expandable fiber-reinforced starch-based compositions used to manufacture molded articles, methods of manufacturing such compositions, and methods of making fiber-reinforced articles therefrom.

2. The Relevant Technology

Many articles in commerce are designed and produced to be disposable after a single use. The most common materials in single-use articles are exemplified by paper, paperboard, plastics, polystyrenes, and metals. In part, the disposability of an item after a single use results from busy lifestyles that require instant or ready-made food and beverage containers. For example, one visit to a fast-food restaurant or convenience store can result in a single person using and discarding multiple disposable containers, some of which were only in use for less than five minutes or the time it takes to transport food from a grill to a serving tray. While these articles are typically disposed of after a single use, or after the primary product has been removed from the article in the form of a container, more often than not the articles are not biodegradable. Due to the overwhelming magnitude of the non-biodegradable, single-use articles being produced and distributed, the final destinations of such articles (e.g., landfills) are quickly becoming oversaturated, incapable, and/or insufficient for properly dealing with and/or destroying these articles.

As stated, one highly used material for the production of single-use items is polystyrene or polystyrene foams. Polystyrene foams and the articles manufactured therefrom are produced from expandable polystyrene (EPS), which are molded into the desired articles or shapes. More particularly, EPS compositions containing a gas or volatile solvent are prepared and expanded by heating so that it increases in volume and decreases in density. EPS compositions expand at ambient pressure until they fill the voids in the mold.

In response to the environmental problems associated with single-use and disposable articles, research has been conducted to find substitute materials that are biodegradable and environmentally friendly. Heretofore, the materials presented as substitutes for paper, paperboard, plastics, polystyrenes, and metals have heretofore exhibited inadequate mechanical properties. As such, a reasonable biodegradable material with sufficient strength characteristics has yet to be produced for being substituted for EPS materials. Thus, there remains a need for a strong biodegradable substitute for EPS compositions and EPS-based products.

Therefore, it would be advantageous to provide a strong biodegradable material that can be substituted for environmentally unfriendly materials. More particularly, it would be advantageous to mechanically reinforce a biodegradable material so as to provide a suitable replacement for EPS beads, sheets, and products.

BRIEF SUMMARY OF THE INVENTION

The present invention is drawn toward a fiber-reinforced starch-based composition. Such a composition is prepared by a process that is performed in two phases, wherein the first phase includes forming a fibrous mixture comprised of gelatinized starch, water, and fibers, wherein the fibers are substantially homogeneously dispersed therethrough. The second phase includes mixing a starch, a non-volatile plasticizer, and a water-resistant polymer into the fibrous mixture and forming a thermoplastic composition. The resulting expandable fiber-reinforced and starch-based composition can be characterized by being thermoplastic, and optionally, capable of expanding when rapidly heated to above the boiling point of the water and the softening point of the composition.

Another embodiment of the present invention includes a method of manufacturing a fiber-reinforced starch-based composition. The method includes acts of: mixing water, fibers, and gelatinized starch under high shear in order to yield a fibrous mixture having a substantially homogeneous distribution of fibers; introducing additional components into the fibrous mixture, wherein the additional components include starch, a non-volatile plasticizer, and a water-resistant polymer; and mixing the fibrous mixture and additional components to yield a thermoplastic composition. As such, the fiber-reinforced and starch-based composition can be fabricated into a variety of articles by various processes such as molding.

The resulting molded article is biodegradable. To protect it from moisture during use and/or storage it may advantageously be coated with an appropriate coating material. The coating material may comprise a biodegradable water-resistant polymer, a hydrophobic polymer, or a wax.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The embodiments of the present invention are drawn to fiber-reinforced starch-based compositions and methods of manufacture and use. The terminology employed herein is used for the purpose of describing particular embodiments only and is not intended to be limiting.

As used herein, the term "starch" is meant to include underivatized starches as well as derivatized starches that are capable of being used in the compositions described herein. The starches can be products of potato, corn, tapioca, wheat, high amylose starch, waxy starches, and the like. Additionally, the term "starch" is meant to include both non-gelatinized and gelatinized starches unless clearly indicated otherwise. On other hand, the term "gelatinous starch" is meant to characterize the starch and/or starch derivative being combined with water into a hydrated dispersion that has been heated and gelatinized, as described in more detail below. Moreover, the term "non-gelatinized starch" is meant to include only starches that have not been gelatinized.

As used herein, the term "fiber-reinforced" is meant to indicate that the composition or article is mechanically stronger in comparison to the same composition or article not having fibers. As such, adding fibers to a starch-based composition can increase the mechanical strength and structural integrity of products produced therefrom.

As used herein, the term "fluid" is meant to refer to a liquid and/or a gas. As such, a fluid is able to fill the volume of a container and flow freely through tubes or pipes.

As used herein, the term "dry weight" is meant to refer to the composition being characterized without the presence of a volatile blowing agent. For example, when the relative concentrations are expressed in percentages by dry weight, the relative concentrations are calculated as if there were no water. Thus, the dry weight is exclusive of any volatile blowing agent such as water.

As used herein, the term "wet weight" is meant to refer to the composition being characterized by the moisture content that arises from the presence of the volatile blowing agent. For example, the relative concentration of the volatile blowing agent is measured by a total weight that includes the volatile blowing agent such as water, which is thereby a wet weight.

As used herein, the term "thermoplastic" is meant to refer to the state of a composition that is capable of being hardened when the temperature is decreased, and softened to the point of being malleable when the temperature is increased.

As used herein, the term "rapidly heating" is meant to refer to the rate at which the temperature of a composition increases. As such, rapidly heating refers to the process of exposing a composition to a heated environment or heating element so as to increase the temperature of the composition at a rate that induces expansion rather than drying.

As used herein, the term "mold gap" is meant to refer to the distance from one side of a mold body to the other side of the mold body. As such, the mold gap is the space between each side of a mold, wherein a mold cavity can have varying mold gap distances at different locations.

As used herein, discussions pertaining to increases in volume that occur due to expansion are recited as a volume that is at least a certain percentage larger than its original volume. This is meant to identify that the volume has increased by the certain percentage to be greater than the original volume. For example, a 0% increase would be the same as the original volume, and a 100% increase would be about double or 2 times the original volume.

Concentrations, amounts, particles sizes and other numerical data may be presented in a range format. It is to be understood that such a range format is used merely for convenience and brevity and should be interpreted flexibly to include not only the numerical values explicitly recited as the limits of the ranges, but also to include all the individual numerical values or sub-ranges encompassed within that range as if each numerical value and sub-range is explicitly recited. For example, in one embodiment starch can be present in various compositions within a range of from about 15% to about 95% by dry weight. This recited range should be interpreted to include not only the explicitly recited limits of about 50% and about 90%, but also to include such individual compositional percentages such as 55, 62, 70, and 88% as well as sub-ranges between these individual percentages. This interpretation should apply regardless of the breadth of the range or the characteristic being described, and should apply to ranges having both upper and lower numerical values as well as open-ended ranges reciting only one numerical value.

An embodiment of the present invention is a biodegradable composition that can be extruded into various shapes and forms for use in expansion, injection, and compression molding systems. As such, the inventive composition includes a starch and/or starch derivative. Also, starch can be gelatinized before or during the preparation of the inventive compositions. Gelatinized starches are typically produced from a starch-water dispersion that is mixed while being heated. After the dispersion reaches a certain temperature, starch granules begin to swell and structurally morph and transform into gelatinous starch. In comparison to starch, gelatinous starch is more susceptible to hydrolysis and enzymatic degradation, which leads to being more biodegradable. Additionally, gelatinized starches can impart higher viscosities to the compositions. A more detailed discussion of starch can be reviewed in the incorporated reference.

Articles prepared from embodiments of the starch-based compositions can substantially degrade when exposed to non-optimal environmental conditions in less than about 5 years, more preferably less than about 3 years, even more preferably less than about 2 years, and most preferably less than about 1 year. Some articles made from different embodiments of the starch-based compositions can degrade in optimal environmental conditions in less than about 10 months, more preferably less than about 8 months, even more preferably less than about 6 months, and most preferably less than about 3 months. Alternatively, articles made from different embodiments of the starch-based compositions can degrade in optimal environmental conditions in less than about 8 weeks, more preferably less than about 6 weeks, and most preferably less than about 3 weeks.

Additionally, the starch-based compositions can include a volatile blowing agent, non-volatile plasticizer, water-resistant polymer, inorganic fillers, nucleating agents and the like. These components can each provide a favorable property in order to enhance the ability of a starch-based composition to be fabricated into expandable compositions and the fiber-reinforced articles made therefrom. A more detailed discussion of each of these components can be reviewed in the incorporated reference.

Additionally, the starch-based compositions include fibers in order to provide structural reinforcement to the expanded beads, foamed sheets, and articles made therefrom, as well as articles made from non-foamed compositions. Various types of fibers may be used in order to obtain specific characteristics. For example, the starch-based compositions can include naturally occurring organic fibers extracted from hemp, cotton, plant leaves, hard woods, soft woods, stems, or the like. Also, the starch-based compositions can include inorganic fibers made from glass, graphite, silica, ceramic, metal materials, and the like. The preferred fibers, for example, include glass fibers, abaca, bagasse, wood fibers and cotton.

In one embodiment, the fibers used in making the starch-based compositions can have a high length to width ratio (or "aspect ratio") because longer, narrower fibers can impart more strength to the finished articles. The fibers can have an average aspect ratio of at least about 25:1, preferably at least about 50:1, more preferably at least about 100:1, and most preferably greater than about 200:1. On the other hand, it can be beneficial to have fibers with a smaller aspect ratio, such as less than about 10:1, because they are generally more easily placed within the expandable compositions, and may result in finished articles with more uniformity and fewer defects. The fibers can be used in various lengths such as, for example, less than 10 mm, more preferably less than 5 mm, and most preferably less than 3 mm. In another embodiment, it can be preferable for the fibers to be less than 2 mm, more preferably less than 1.5 mm, and most preferably less than 1 mm.

The amount of fibers added to the starch-based compositions will vary depending upon the desired properties of the finished fiber-reinforced articles. Such properties can be increased tensile and compressive strength, toughness, and flexibility. The concentration of fibers within the starch-based compositions can be in the range from about 1% to about 50% by weight of the dry components (i.e., exclusive of water) within the composition, more preferably from about 2% to about 30%, and most preferably from about 5% to about 15%.

In one embodiment, the various above-described components can be mixed together to form a starch-based composition that includes fibers so as to reinforce the articles made therefrom. As such, these components can be sufficiently mixed together in order to obtain a composition having fibers homogenously distributed therethrough. In any event, these components can be used in the processing systems and methods of manufacture that are described in more detail below.

Additionally, any of the fiber-reinforced and starch-based compositions and articles prepared therefrom can be biodegradable. That is, when the compositions are exposed to the environment for an extended time, the components can break down and degrade. As such, the products obtained from the compositions and processes described herein can be environmentally friendly by being prepared from natural resources and being configured to naturally degrade.

Accordingly, FIGS. 1-9 illustrate various schematic diagrams of embodiments of processing systems and equipment that can be used during the formation of a starch-based composition or a fiber-reinforced article of manufacture. It should be recognized that these are only examples of schematic representations illustrated for the purpose of describing the various processing systems and equipment, and modifications can be made thereto in order to prepare the inventive starch-based compositions and articles of manufacture. Also, the schematic representations should not be construed in any limiting manner as to the arrangement, shape, or size of any of the features described in connection therewith. With that said, a more detailed description of the systems and equipment that can prepare the compositions as well as manufacture articles that are in accordance with the present invention is now provided.

Figure 1:
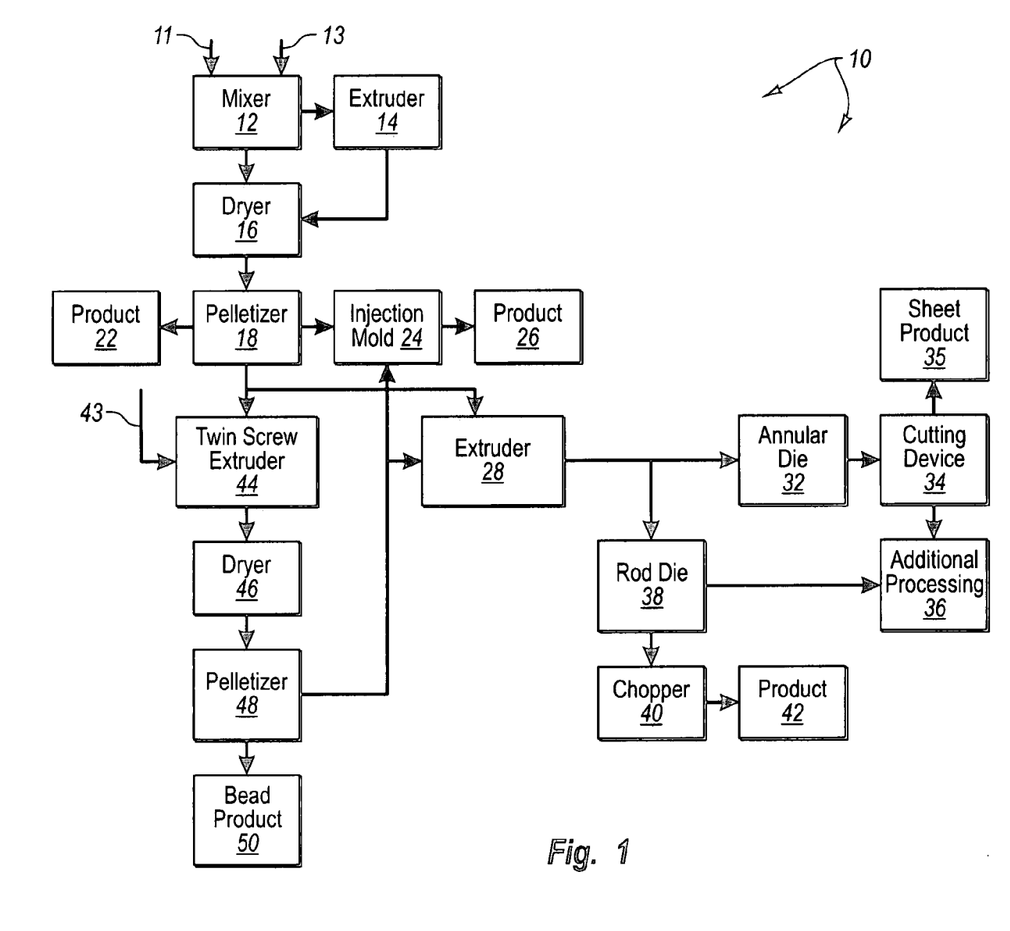
FIG. 1 is a schematic diagram that illustrates an embodiment of a system for preparing fiber-reinforced and starch-based compositions.

Referring now to FIG. 1, which depicts one embodiment of a starch processing system 10 in accordance with the present invention. Such a starch processing system includes a mixer 12 that receives at least one supply stream 11 of materials to be mixed therein. The supply stream 11 can supply starch, a volatile blowing agent such as water, and fibers into the mixer 12.

Accordingly, the mixer 12 can receive and mix gelatinized starch or non-gelatinized starch. When receiving gelatinized starch, the mixer 12 can operate under cold conditions so as to impart high sheer mixing to the starch, fiber, and water composition. Alternatively, the mixer 12 receives non-gelatinized starch, which is then mixed at high shear under elevated or high temperatures such as above about 80° C., more preferably above about 90° C., and most preferably above about 95° C. In this configuration the mixer operates under high temperatures during the high sheer mixing so as to gelatinize the starch during the processing. In any event, mixing the fibers with the gelatinized starch enables the mixer 12 to homogenously mix the fibers throughout the composition.

After the fibers have been homogenously distributed throughout the gelatinized starch and water composition, additional components can be added into the mixer 12 through feed 13. As such, feed 13 can supply water-resistant polymers, wax, nucleating agents, non-volatile plasticizers, volatile blowing agents, un-gelatinized starch, inorganic fillers, and the like. Accordingly, these additional components are added into the mixer 12 after the fibers have been homogenously distributed. This can provide for enhanced mixing and result in a starch-based and fiber-reinforced composition for further processing.

In one embodiment of a starch processing system 10 in accordance with the present invention, the starch-based and fiber-reinforced mixture obtained from the mixer 12 can be provided directly into an extruder 14. Such an extruder 14 can be any known type of extruder including a piston extruder, single screw extruder, twin screw extruder, and alike. While being processed through the extruder 14, the starch-based and fiber-reinforced mixture can be further mixed and extruded before any further processing. Optionally, the extruder 14 can include at least one heating element so as to form a thermoplastic mixture capable of being extruded at high temperatures that will solidify as the extrudate is cooled.

In the alternative, the starch-based and fiber-reinforced composition obtained from the mixer 12 can be supplied directly into an optional dryer 16. The dryer 16 can be configured to obtain a temperature for removing any access water or other volatile blowing agent. After the starch-based composition is adequately dried, it can be directed into a pelletizer 18 in order to be chopped up into small pellets. One optional use for the pellets obtained from the pelletizer 18 is to be directed into storage as a pellet product 22.

Alternatively, the starch-based and fiber-reinforced pellets can be directed into an injection mold 24. As such, the pellets can be supplied into an injection mold 24 that is operated under pressure in heat so as to form injection molded articles. Thus, the injection mold 24 can yield a molded product 26, which can be a single-use product such as a cup, bowl, or container that is biodegradable.

In another alternative, the pelletizer 18 can provide pellets, such as in a granular form, that are configured to be delivered into an extruder. Such an extruder could be a twin screw extruder 44, or a single or twin screw extruder 28. While a powdered, dispersion, or other fluid starch-based mixture can be provided directly into an extruder, it can be beneficial to pelletize the mixture before being introduced into the hopper of an extruder.

In any event, when the pellets obtained from the pelletizer 18 are supplied into the extruder 28, it can be further mixed into a relatively non-dense extrudate. The extruder 28 is configured to expand the extrudate being extruded from the annular die dead 32 or rod die head 38, wherein elevated temperatures or pressures can enable such expansion.

In one embodiment, the die head can be an annular die head 32 such that a hollow tubular extrudate is produced therefrom. This hollow tubular extrudate produced from the annular die head 32 can be further processed by a cutting device 34. Such a cutting device 34 can cut the extrudate in cross-sectional cuts so as to form a plurality of rings. Alternatively, the cutting device can longitudinally cut the hollow tubular extrudate so that it can be laid open into a flat sheet, wherein the opened foamed sheet can be used as a sheet product 35 that is storage-stable. In another alternative, the opened foam sheet can be supplied to an additional processing 36 apparatus or system such as through a compression or thermal mold in order to obtain an article in manufacturer. In any event, the materials produced from the cutting device 34 can undergo additional processing 36. Such additional processing will be described below.

In another embodiment, the extruder 28 can have a rod-shaped die head 38 that produces a foamed extrudate having a solid cross-sectional area. Such a foamed extrudate produced from a die head 38 can be supplied into a chopper 40. The chopper 40 can chop the extrudate into various shapes and sizes which can then be supplied as a product 42, such as for loose fill packing, or for additional processing. Thus, various modifications to the processing schemes described in connection with the extruder 28, or other modifications or configurations may be made or used within the concept of the invention.

In one embodiment, the pellets obtained from the pelletizer 18 are fed into a twin screw extruder 44 that is configured so as to be able to compact and/or densify the pellets obtained from the pelletizer 18. Additionally the twin screw extruder 44 can receive an additional feed of material such as through stream 43. In any event, the twin screw extruder 44 is capable of receiving pellets as well as additional materials for compacting and/or densifying such materials into an extrudable mixture before being extruded into a relatively solid and/or dense extrudate.

The extrudate is then delivered into a dryer 46 so that any excess water or other volatile blowing agent can be removed before being pelletized. As such, the dried extrudate is then sent into another pelletizer 48 that can produce pellets or beads comprised of the starch-based and fiber-reinforced compositions. The small bead product 50 is storage-stable and can be transported over long distances. Also, the pelletizer 48 can provide small, compact, and dense starch-based beads for additional processing. Such additional processing can include supplying the beads in the injection mold 24 and/or the extruder 28, and processing as described in connection therewith.

Figures 2, 3:
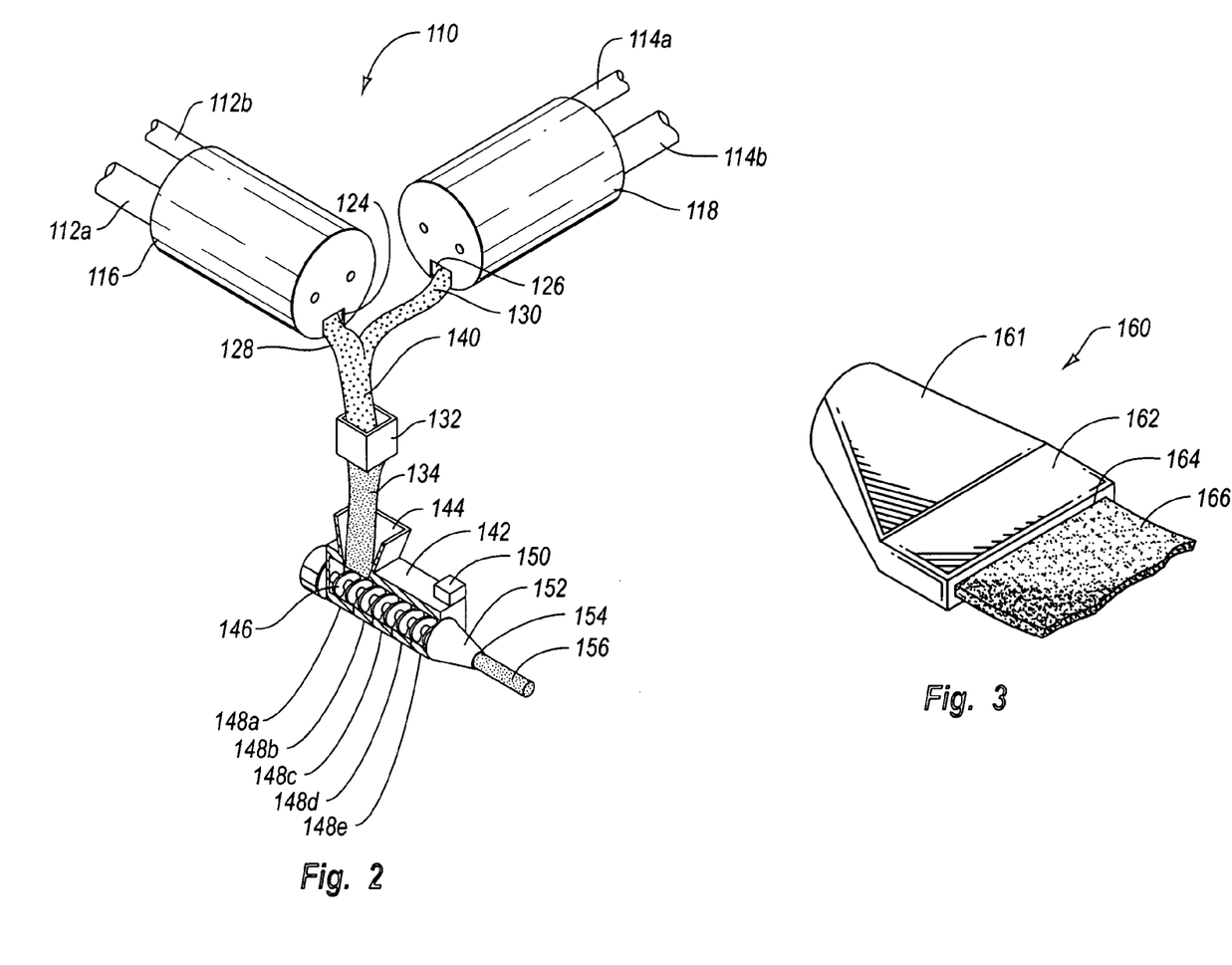
FIG. 2 is a schematic diagram that illustrates an embodiment of a system for preparing fiber-reinforced and starch-based composition.
FIG. 3 is a perspective view of an embodiment of a die head usable with the system of FIG. 2.

With reference now to FIG. 2, one embodiment of an extrusion system 110 in accordance with the present invention is depicted. Such an extrusion system 110 includes a first mixer 116, optional second mixer 118, processor 132, and an extruder 142. The first mixer 116 is configured to receive at least one feed of materials through a first feed stream 112a, and optionally, receive another feed of materials through a second feed stream 112b for being mixed together into a starch-based and fiber-reinforced composition. After adequate mixing, which can be performed under high shear and heat, the starch-based mixture is removed from the first mixer 116 via an outlet 124, wherein the resultant flow of material is a first mixed stream 128.

Similar to the first mixer 116, the optional second mixer 118 has a first feed stream 114a that supplies the material to be mixed into a second mixture, where such mixing can be enhanced by the inclusion of a heating element. Optionally, the second mixer 118 can include a second feed stream 114b to supply additional materials to be combined into the mixture. After processing, the second mixture is removed from the second mixer 118 via an outlet 126 as a second mixed stream 130. The second mixer 118 is optional because the additional components could be mixed in the first mixer 116 with or without the starch-based and fiber-reinforced composition.

By mixing the starch-based and fiber-reinforced composition apart from the second mixture, the respective components can be homogenously distributed throughout each composition. For example, it can be advantageous to homogeneously mix the fibers with gelatinized starch and water before being combined with the additional Fi components. As such, the starch-based and fiber-reinforced composition can include starch, fibers, and water. Additionally, the second mixer 118 can receive and mix the additional components, such as the un-gelatinized starch, volatile blowing agent, non-volatile plasticizer, water-resistant polymer, optional nucleating agent, or the like before being combined with the starch-based and fiber-reinforced composition.

In one embodiment, the first mixed stream 128 and second mixed stream 130 can be combined in an optional processor 132. The optional processor can have various configurations in order to process the starch-based and fiber-reinforced composition. Accordingly, the optional processor can include a heater, dryer, extruder, pelletizer, and/or the like. This enables the starch-based and fiber-reinforced composition to be processed by any of the schemes described in FIG. 1. Also, it enables alterations in the manufacturing process to implement changes for obtaining dense, expandable, or expanded compositions. Thus, the manufacturing process depicted in FIG. 2 can include modifications or additional processing and still be within the scope of the present invention.

After being prepared, the first mixed stream 128, second mixed stream 130, and/or the product 134 obtained from the optional processor 132 can be introduced into an extruder 142. The extruder 142, which can be any type of extruder, can include an inlet 144, extruder screw 146, heating elements such as the five illustrated heating elements 148a-e, a control module 150, and a die head 152 with a die opening 154; however, it should be realized that modifications and variations can be made to the extruder within the scope of the invention. Thus, the extruder 142 can be any type of extruder such as a single screw extruder, twin screw extruder, piston extruder, or the like as well as those with or without heating elements.

In any event, the feed being introduced into the extruder is processed and further mixed by the extruder screw 146, and then moved past one or a plurality of heating elements such as the illustrated five heating elements 148a-e. For example, the five heating elements 148a-e can be set to have a temperature gradient such as 80° C./95° C./110° C./130° C./150° C. This heating configuration can provide for a gradual increase in heating so as to avoid prematurely blowing off the volatile blowing agent. As such, any number of heating elements can be configured for temperature ramping, a parabolic temperature change, or the like, as well as for expansion extrusion. In order to control the rate of mixing, extrusion, temperature distribution, extrudate expansion, and the like, the extruder 142 includes a control module 150.

As the starch-based and fiber-reinforced composition moves to the end of the extruder 142, it passes through the die head 152 before being extruded at the die opening 154. The die head 152 and die opening 154 can be configured into any shape or arrangement in order to provide an extrudate that is capable of being further processed as described herein. In one embodiment, it can be advantageous for the die opening 154 to have a small circular diameter so that the extrudate 156 is similarly a rod-like shape. These rod-like extrudates can be supplied into an injection mold.

In one embodiment, the heating elements 148*a-e* in the extruder 142 can be configured to heat the starch-based composition in order to cause the composition to expand upon being extruded through the die opening 154, which is known as expansion extrusion. As such, the extruder 142 is heated, especially at the die head 152, so that the extrudate 156 sufficiently expands and puffs while being forced through the die opening 154. This expansion can result from the pressure differential between the inside of the extruder to the external atmospheric pressure. Thus, expansion extrusion can serve to obviate the need for further equipment or processing in order to expand the extrudate 156. These expanded rod-like extrudates can be cut to be used as loose fill packing materials similar to polystyrene peanuts or supplied into an injection mold.

In some instances it can be preferred to first extrude the composition through a single screw or pasta-like extruder. This gives the extrudate a long rod-like configuration, which can then be further processed as described herein. Alternatively, the long rod-like extrudate obtained by the single screw extruder can be additionally extruded through a twin screw extruder, which can enhance homogenization and/or densification in some cases. In another alternative, the composition can be passed through a twin screw extruder without first being processed through a single screw extruder.

With reference now to FIG. 3, another embodiment of a die head 160 is provided. Such a die head 160 has a long-rectangular cross-section and is operable with the extruder 142 shown and described with respect to FIG. 2, and can provide a sheet-shaped extrudate. The die head 160 is similarly configured to have a tapered body 161 that reduces the cross-sectional area of the extruded material before passing through the flattening section 162 that laterally distributes the materials being extruded. The die opening 164 forms a sheet-shaped extrudate 166, which can be a solid ribbon, expandable sheet, expanded sheet, or the like. Another alternative die head can include an annular opening, or other similar opening. When an annular die is used, the resulting expanded hollow tube extrudate can be cut down the middle to result in an expanded extrudate sheet. Also, the hollow tube extrudate can be cut to provide foamed rings.

Figure 4:
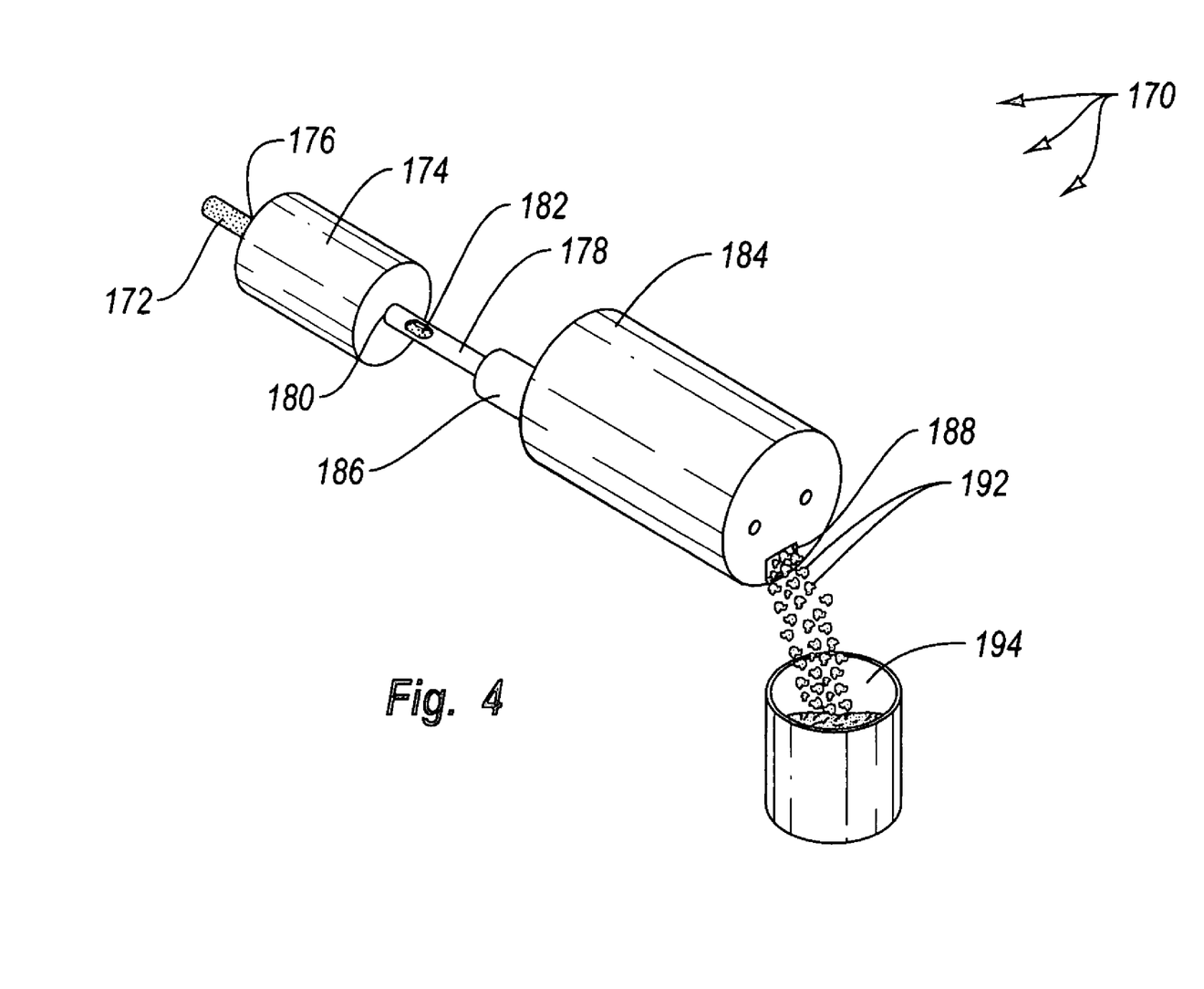
FIG. 4 is a schematic diagram that illustrates an embodiment of a pelletizing system.

FIG. 4 depicts a schematic diagram of an embodiment of a pelletizing system 170. The pelletizing system 170 is configured for processing a feed material 172 that has been prepared in accordance with any of the pelletizers in the starch processing system 10 described in connection with FIG. 1. As such, the pelletizing system 170 generally includes a dryer 174 and pelletizer 184.

As illustrated, the dryer 174 includes an inlet 176 for receiving a feed material 172 in a moistened state and an outlet 180 for removing a dried material 82. When the feed material enters the inlet 176, it can have a moisture content greater than about 40%, greater than about 30%, or greater than about 20%, any of which can be too moist for being pelletized in some pelletizers. The dryer 174 can be configured to be operated at a temperature sufficient for evaporating or removing any water or other volatile blowing agent present in the feed material 172, but without causing any significant expansion or cell formation. Removal of the water or other volatile blowing agent can be important when the feed material 172 has a high moisture content that may inhibit the ability of the pelletizer 184 to properly cut, chop, or otherwise pelletize the starch-based and fiber-reinforced feed material 172 into pellets 192 or beads.

The dried material 182 is supplied by a pipe 178 or other transport means to the pelletizer 184 via the inlet 186. The pelletizer 184 can be configured for cutting the dried material 182 into pellets 192 or beads having a variety of shapes and sizes. For example, the pellets 192 can have an average diameter range of from about 0.2 mm to about 1 cm, more preferably in a range of from about 0.3 mm to about 5 mm, and most preferably in a range of from about 0.5 mm to about 0.8 mm In another embodiment, it can be preferable to have pellets with a diameter range of from about 0.2 cm to about 2 cm, more preferably in a range of from about 0.3 cm to about 1 cm, and most preferably in a range of from about 0.5 cm to about 0.8 cm diameter.

In any event, the pellets 192 are then removed from the pelletizer 184 via the outlet 188 after reaching the desired size and then supplied to a pellet collector 194.

Figure 5:
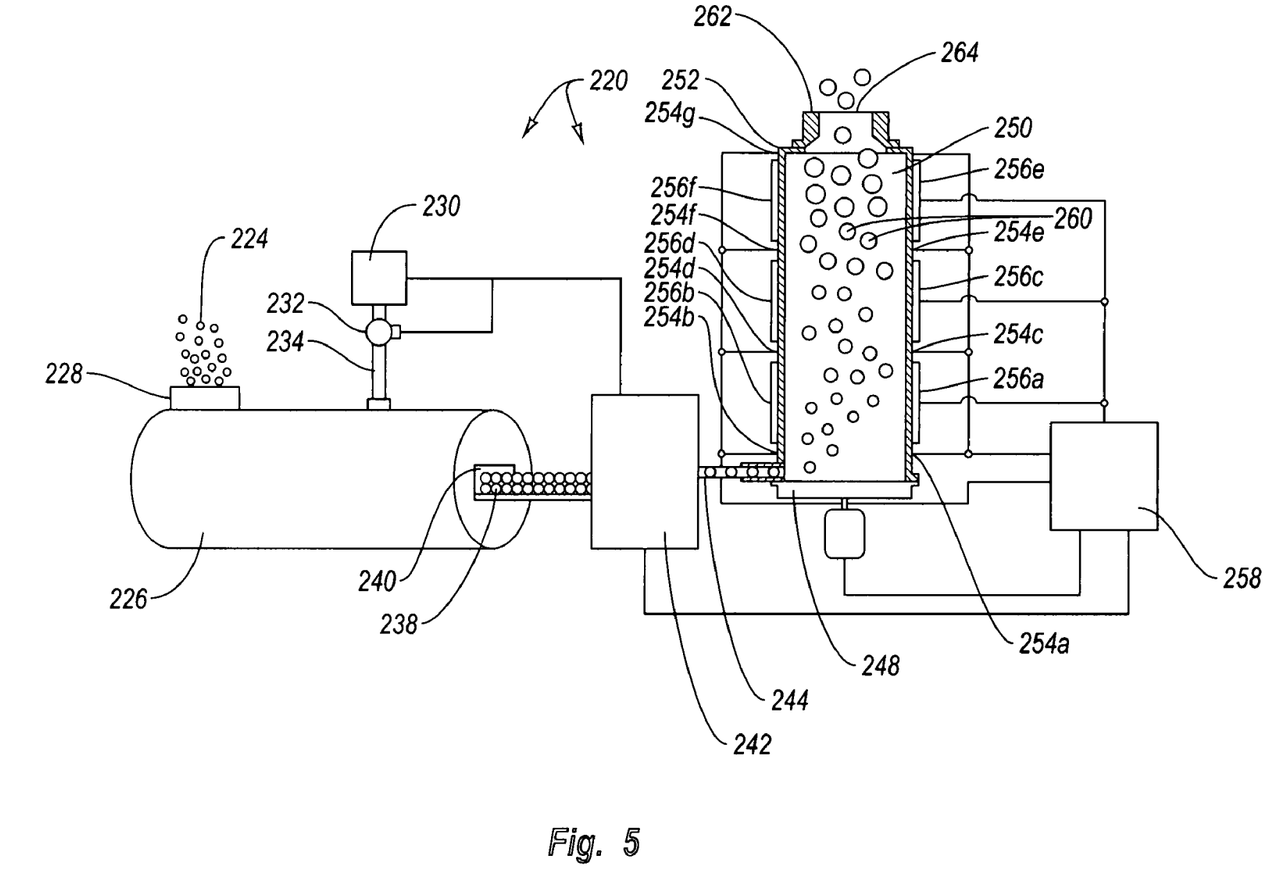
FIG. 5 is a schematic diagram that illustrates an embodiment of a pre-expansion system.

Referring now to FIG. 5, which illustrates a schematic representation of an embodiment of a pre-expansion system 220. The pre-expansion system 220 is comprised of a hydration vessel 226, volatile solvent storage tank 230, and a pre-expansion vessel 248. The pre-expansion system 220 is configured to process starch-based and fiber-reinforced pellets 224 (i.e., beads 224) in a manner that partially expands the beads 224, or alternatively, to the full expansion potential. The pre-expansion system 220 can provide partially expanded beads having an average diameter that can be used in pre-existing expansion molding equipment such as expandable polystyrene equipment.

In operation, the beads 224 are supplied to the hydration vessel 226 via an inlet 228. The hydration vessel 226 is fluidly coupled with a volatile agent storage tank 230 through a feed tube 234 that includes a flow valve 232 for metering and regulating the amount of volatile agent supplied thereto. The hydration vessel 226 hydrates the beads 224 to have a variety of moisture contents. For example, the hydrated beads 238 can have a moisture content of about 10%, about 15%, about 20%, and about 30% by wet weight. Alternatively, preferred moisture content ranges can be about 4% to about 30% by wet weight, more preferably about 5% to about 18%, and most preferably about 8% to about 15%.

In another embodiment, an extrudate in any shape or configuration can be re-hydrated as described herein. For example, an extrudate in the shape of a sheet or ring can be similarly re-hydrated.

The hydrated beads 238 are removed from the hydration vessel 226 via an outlet 240, and transferred into a pre-expansion feed control chamber 242. The feed control chamber 242 is coupled with the feed tube 244 that supplies the hydrated beads 238 into the pre-expansion vessel 248.

As depicted, the pre-expansion vessel 248 includes an expansion chamber 250 defined by a housing 252. Since FIG. 5 is only a schematic representation, the expansion chamber 250 can have any configuration and orientation now known or later developed for expanding hydrated beads of any composition. For example, the expansion chamber 250 can be a hot air fluidized bed that receives hydrated beads 238, which then are blown out as expanded beads 260.

In one embodiment, the pre-expansion vessel 248 includes a plurality of sensors 254*a-g* and heating elements 256*a-f*, which can be ports that supply hot air and/or steam into the chamber 250. The plurality of sensors 254*a-g* can be configured to monitor the temperature and/or relative humidity at various locations in the chamber 250 by being in communication with a control module 258, which then controls the heating elements 256*a-f*. This allows for the chamber 250 to be capable of being maintained at a constant temperature and/or humidity as well as to have a variant temperature or humidity distribution. For example, the control module 258 can regulate the temperature within the chamber 250 to be within a range of from about 80° C. to about 240° C., more preferably about 100° C. to about 210° C., and most preferably about 160° C. to about 190° C.

After traversing the length of the chamber 250, the beads 238 are partially "puffed" into pre-expanded beads 260. These pre-expanded beads 260 then move into the outlet head 262 region of the pre-expansion vessel 248. The outlet head 262 contains an outlet opening 264 that serves to enable the pre-expanded beads 260 to be removed from the chamber 250.

In another embodiment, the hydrated fiber-reinforced beads can be more fully expanded by the pre-expansion system. As such, the fiber-reinforced beads can be expanded to a volume that is about 2-times greater than their original volume, more preferably at least about 5-times greater, even more preferably at least about 10-times greater, or most preferably to at least about 25-times greater than their original volume. As such, the density of the expanded fiber-reinforced beads can decrease by about ½ of the original density, more preferably about 1/10 of the original density, and most preferably about 1/25 of the original density.

Additionally, the hydrated fiber-reinforced beads can be expanded into expanded beads, each characterized as a fiber-reinforced foamed bead that is much dryer than the hydrated beads. Accordingly, when the fiber-reinforced foam beads are to be molded by hot air expansion, the beads may need to be re-hydrated, which can be done in a vessel similar with the re-hydration vessel described herein. For example, the fiber-reinforced re-hydrated expanded beads can have a moisture content for further expansion of about 4% to about 30%, more preferably about 8% to about 18%, and most preferably about 10% to about 15% moisture by weight. The re-hydrated beads can be molded by compression, injection, or expansion molding.

Figure 6:
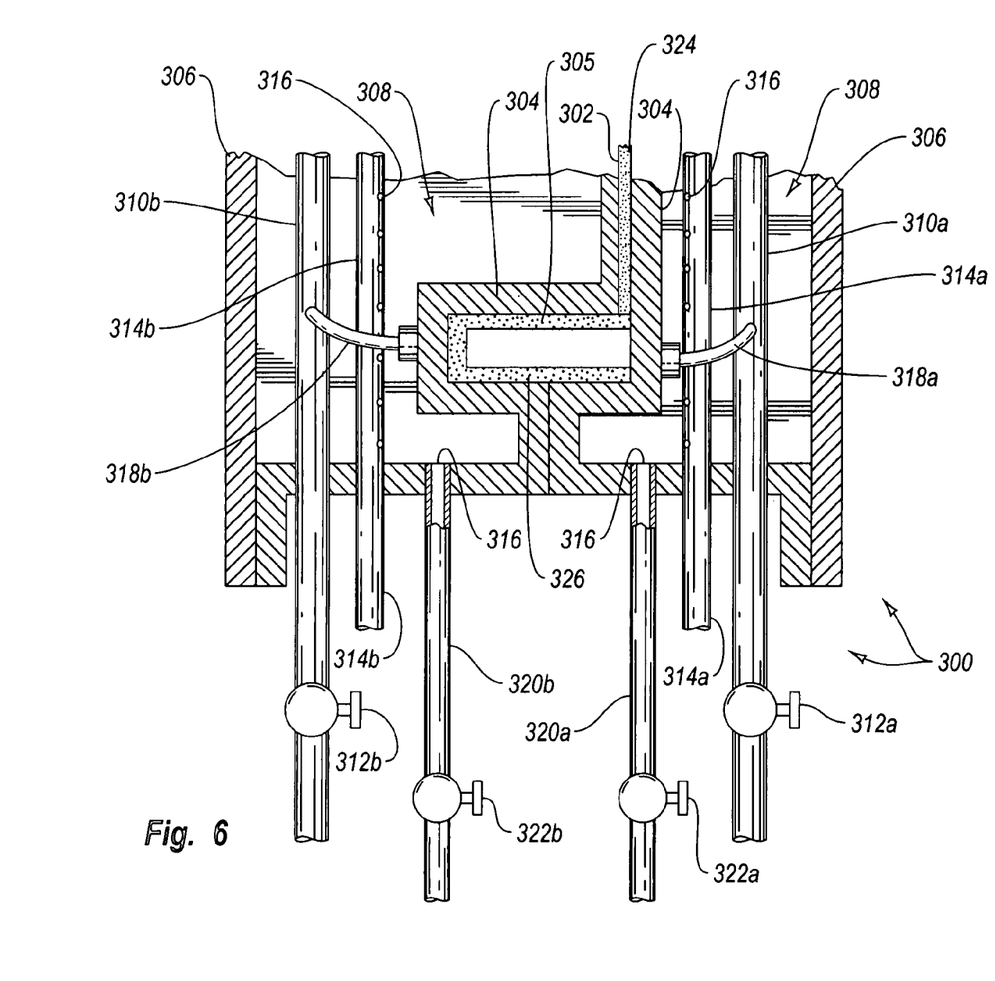
FIG. 6 is a cross-sectional schematic diagram of an embodiment of an a expandable-bead molding system.

Referring now to FIG. 6, which illustrates an embodiment of an expansion molding system 300 in accordance with the present invention. The molding system 300 is comprised of a feed tube 302, mold body 304, housing 306, and heating components 310*a-*322*b*. As such, the molding system 300 can be configured for manufacturing an article from pellets, hydrated beads, pre-expanded beads, and/or any expandable bead such as those having a water-resistant coating, which are prepared as described above so as to be fiber-reinforced. Alternatively, the molding system 300 can be configured to receive a feed of unprocessed or un-foamed fiber-reinforced extrudate rods, sheets, or ribbons in order to prepare articles of manufacture, where modifications for processing such un-foamed feeds are self-evident.

The molding system 300 has a feed tube 302 that can transport non-expanded beads, hydrated beads, pre-expanded beads, and even pre-expanded beads that have been re-hydrated, dehydrated, and/or coated with a water-resistant polymer or wax. For simplicity, any type of starch-based and fiber-reinforced bead being supplied to the molding system 300 can be denoted as a bead 324. The feed tube 302 can extend through the mold 304 in a manner that facilitates beads 324 being supplied into the mold cavity 305 in an amount and disposition sufficient to be properly molded into an article. The mold body 304 can be in any shape and size as desired so that the molded article has substantially the same shape as the mold cavity 305.

In one embodiment, the mold body 304 is disposed within a cavity 308 that is defined by a housing 306. The cavity 308 can be configured to retain a fluid, such as hot air, steam, heated vapor, or a heated liquid, so as to contact the mold body 304. This can provide a heat source to modulate the temperature of the mold body 304 as well as the mold cavity 305.

The housing 306 can be configured to receive various heat supplies such as steam tubes 3110*a-b*, auxiliary heating tubes 314*a-b*, and hot air tubes 320*a-b*, where each is in thermal communication with the mold body 304 and the mold cavity 305. Each steam tube 310*a-b* and hot air tube 320*a-b* includes a valve 312*a-b* and 322*a-b*, respectively, that dynamically opens and closes so as to meter the amount of steam, hot air, or other heated fluid being supplied to the mold cavity 305 or cavity 308. The steam tubes 310*a-b* are each coupled to a steam channel 318*a-b* that transports the steam into the mold cavity 305.

Additionally, the hot air tubes 320*a-b* and/or auxiliary heating tubes 314*a-b* can be in thermal communication with the mold cavity 305 or cavity 308 via ports or inlets 316. This allows for the heated medium to be circulated into the mold cavity 305 so as to contact the beads 324, and flow through the interstitial spaces between the beads 324 during the molding process. Also, the steam can be removed from the mold cavity 305 through outlet ports (not shown). In one embodiment, the heating can include raising the temperature from normal ambient conditions to a temperature range of from about 80° C. to about 240° C., more preferably from about 100° C. to about 210° C., and most preferably from about 160° C. to about 190° C. However, other heating ranges can be used depending on the composition and hydration of the beads 324.

In operation, the expansion molding system 300 is configured to provide hot air, steam, or volatile agent from the various feed tubes into the mold cavity 305 in an amount and temperature sufficient to cause at least the outer surface of each fiber-reinforced bead 324 to become softened and pliable so that when the beads 324 expand in volume and come into contact with one another, the beads 324 are capable of sticking together. As such, the fibers can then extend between two beads so as to reinforce the molded article. When the fiber-reinforced beads 324 stick together, they can adhere together to form an article comprised of the expansion molded beads 326 and gas. For example, the article can be comprised of gas from about 98% to about 30% by volume, or more preferably about 95% to about 50%, and most preferably about 90% to about 60% by volume. Accordingly, the solid content of the expanded fiber-reinforced bead material can be about 2% to about 70% by volume, more preferably about 5% to about 50% and most preferably about 10% to about 30% of the expanded bead. However, other gas to fiber-reinforced bead material variations can be achieved.

In operation, the expansion molding system 300 can supply steam, hot air, and/or other volatile blowing agents in order to rapidly heat the beads 324 rather than a slow rate that tends to dry the beads. In one embodiment, the rate of heating can increase the temperature of the medium surrounding the beads to the aforementioned temperature ranges within about 30 seconds, more preferably within about 20 seconds, even more preferably about 10 seconds, and most preferably less than about 5 seconds. Alternatively, the heating can cause the beads to increase in temperature at a rate of about 10° C. per minute, more preferably about 50° C. per minute, and most preferably about 100° C. per minute or faster.

In any event, the rate at which the fiber-reinforced beads are heated can be controlled by convection and conduction heating, where the heating medium can greatly alter the rate of heating and the amount of time it takes for expansion to initiate. As such, it is possible that after heating has initiated, the fiber-reinforced beads can begin to expand within about 30 seconds, more preferably within about 10 seconds, and most preferably within about 5 seconds.

Figure 7:
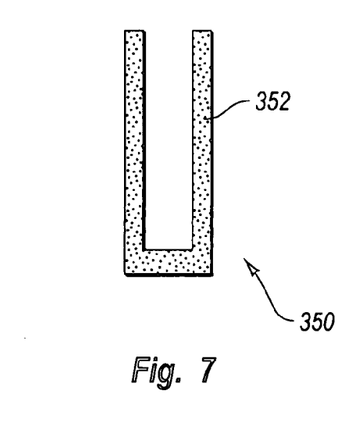
FIG. 7 is a cross sectional view of an embodiment of a molded article prepared with expandable-bead molding system of FIG. 5.

Referring now to FIG. 7, which illustrates an embodiment of a fiber-reinforced article 350 prepared by expansion molding in accordance with the present invention. As such, the fiber-reinforced article 350 was prepared with the expansion molding system 300 depicted in FIG. 6. In any event, the expansion molded article 350 is comprised of expanded starch-based beads 352 that are structurally reinforced with fibers. Alternatively, the fiber-reinforced starch-based article 350 can be molded to have any moldable shape and/or size. For example, the article 350 can be a cup or other article that has been heretofore prepared by expandable polystyrene beads.

Figure 8:
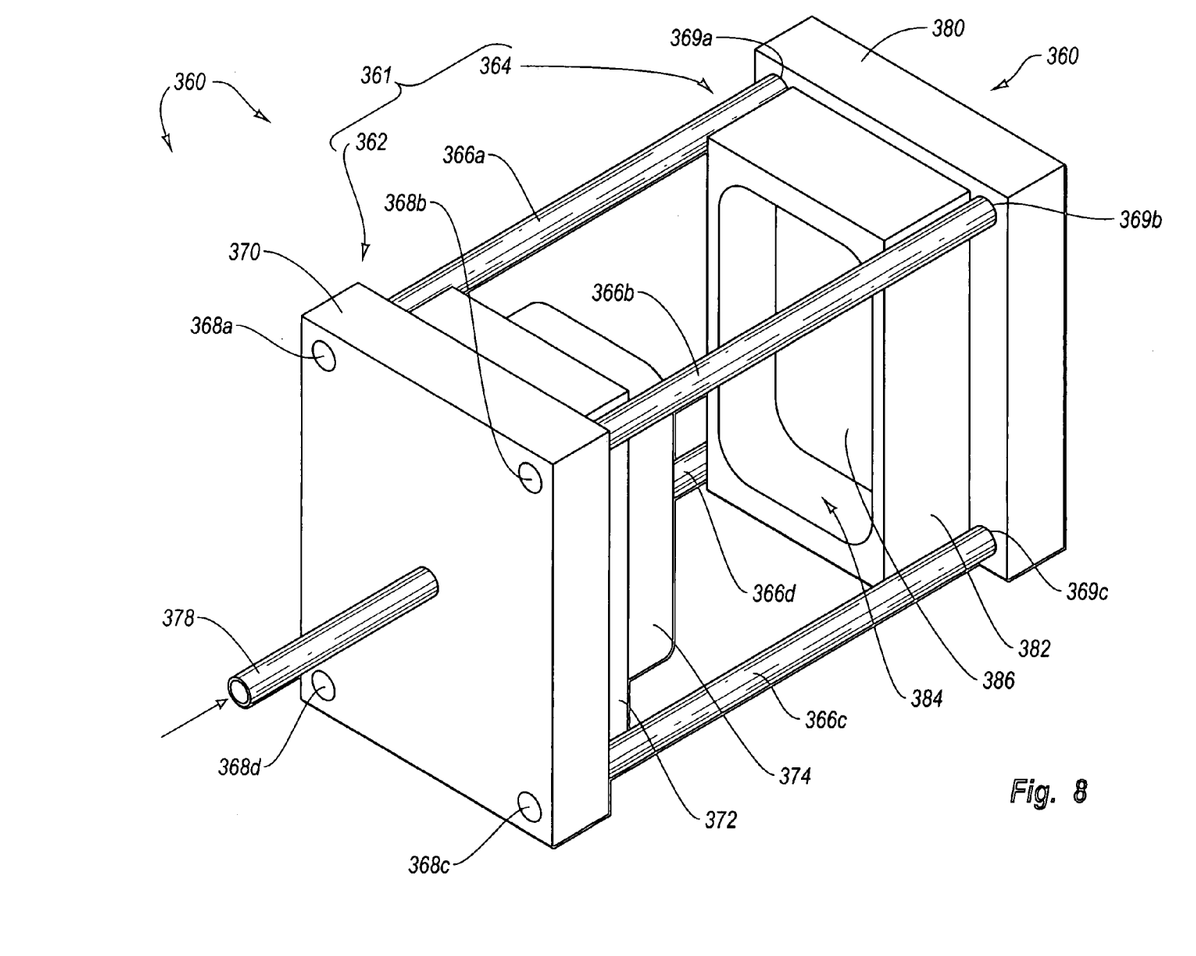
FIG. 8 is a perspective view of an embodiment of a molding system.

Referring now to FIG. 8, which illustrates an embodiment of the molding system 360 in accordance with the present invention that operates by compression or injection molding. Such a molding system 360 includes a mold 361 comprised of a first mold half 362 and a second mold half 364. The first mold half 362 and the second mold half 364 can be joined together during a molding procedure, and thereafter separated so that an article prepared during the molding procedure can be extracted. When the molding system 360 is an injection molding system, the molding system 360 can include a heater and/or an extruder-like apparatus (not shown), which allows for the fiber-reinforced composition such as a rod, ribbon, dense pellet, loose fill pellet, and/or expanded pellet to be melted and injected into the mold at a high enough pressure so that it does not foam during the molding process.

In the illustrated embodiment, the first mold half 362 includes a first mold support 370, a first mold body 372, and a first mold stamp 374. Additionally, the first mold support 370 includes the rod apertures 368a-d extending therethrough. The rod apertures 368a-d receive the guide rods 366a-d that enable operation of the mold 361. Correspondingly, the second mold half 364 includes a second mold support 380, a second mold body 382, a second mold cavity 384, and a second mold cavity wall 386. The second mold support 380 includes the guide apertures 369a-c (one aperture not shown) so as to be oriented with respect to the guide rods 366a-d. Additionally, the second mold body 382 is configured to cooperate with the second mold cavity wall 386 in order to form the second mold cavity 384.

Additionally, in order for an article to be molded with the molding system 360, an extrudate inlet 378 is provided that can receive the extrudate materials prepared by the systems and methods described herein. During operation, a starch-based and fiber-reinforced composition in any of the foregoing forms can be supplied into the inlet 378 and melted so as to flow into the mold 361.

Figure 9:
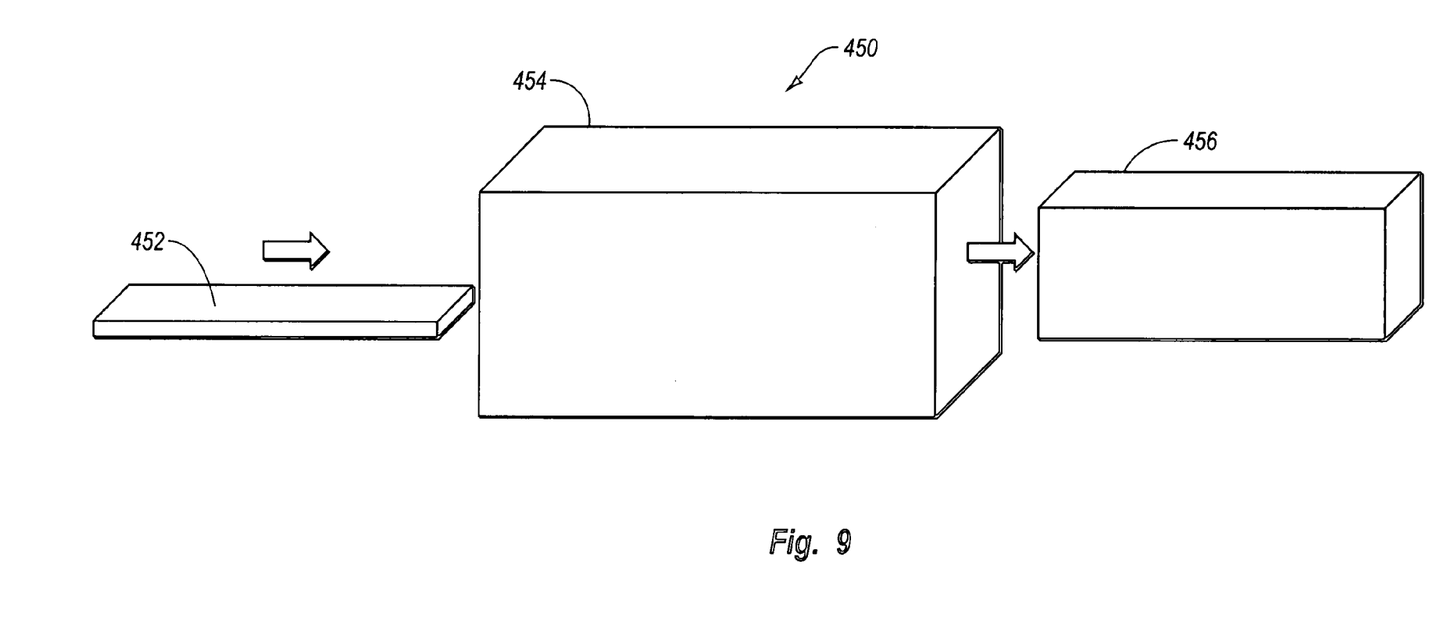
FIG. 9 is a schematic diagram of an embodiment of a molding system.

With reference now to FIG. 9, the schematic diagram illustrates an embodiment of an article molding system 450, which can include a compression mold apparatus or a thermal forming mold apparatus. Such an article molding system 450 can generally use a pre-foamed sheet 452 as described herein or by any means known in the art in order to prepare a molded article 456.

The article molding system 450 is configured to receive the pre-foamed sheet 452 into the molding apparatus 454, such as a compression mold apparatus or a thermal-forming mold apparatus. The molding apparatus 454 can have various configurations in order to provide a molded article 456 having the desired shapes and functionalities. Various configurations of such a molding apparatus 454 can be used as is common in the art in order for a compression molding, thermal-forming molding, or other similar molding technique to be used for producing the molded articles 456 from either pre-foamed sheets 452 or other non-foamed sheets such as ribbons.

In one embodiment of the present invention, the compositions and processes described herein can be adapted to be used for "drop-in" replacements for polystyrene systems. As such, the various processes and equipment typically used in preparing a polystyrene article can be used for preparing the fiber-reinforced, starch-based articles of the present invention.

Additionally, while water can be beneficial in the manufacturing of the compositions in accordance with the present invention, some finished articles can be prepared to be substantially devoid of any water. As such, the compositions of the present invention can have substantially no water, or from about 0.001% to about 8% by wet weight, or more preferably from about 0.01% to about 5% by wet weight, and most preferably from about 0.1 to about 2.5% by wet weight.

The following examples are presented in order to more specifically teach the method of forming fiber-reinforced starch-based compositions that can be processed into articles of manufacture according to the present invention.

EXAMPLES OF EMBODIMENTS OF THE INVENTION

Example 1

Expanded Biodegradable Starch Beads

Various fiber-reinforced starch-based compositions can be prepared for processing into a bead in accordance with the present invention. The fiber-reinforced starch-based compositions can be prepared in two mixing phases. The first mixing phase can be prepared by combining ethylene-vinyl alcohol copolymer (EVOH), glycerol, non-gelatinized starch, and talc into a mixer and mixing under normal conditions. The second mixing phase can be prepared by mixing non-gelatinized starch, fibers, and water into a high shear mixer and mixed with high shear at about 80° C. to about 100° C. in order to gelatinize the starch and homogeneously distribute the fibers therein. The first mixing phase and the second mixing phase can then be admixed together under normal conditions. Examples of the possible relative concentrations are provided in weight percent based on the dry weight in the absence of water, and the water concentration is based on the moisture content relative to the dry weight. The starch-based compositions can be "prophetically" processed into beads and expanded in a hot-air hopper to form a "puffed" bead. The "prophetic" results of a moisture-density study are set forth in Table 1 as follows:

TABLE 1

| % | EVOH | Glycerol | Fiber | Talc | Starch | Total | Water | Bulk Density |
|---|---|---|---|---|---|---|---|---|
| 1 | 5 | 10 | 10 | 0 | 75 | 100 | 15 | 0.40 |
| 2 | 5 | 22 | 15 | 1 | 57 | 100 | 10 | 0.25 |
| 3 | 5 | 18 | 5 | 4 | 68 | 100 | 15 | 0.15 |
| 4 | 5 | 5 | 14 | 4 | 72 | 100 | 10 | 0.30 |
| 5 | 5 | 10 | 5 | 0 | 80 | 100 | 20 | 0.20 |
| 6 | 10 | 20 | 14 | 0 | 66 | 100 | 15 | 0.35 |
| 7 | 10 | 15 | 5 | 0 | 70 | 100 | 10 | 0.45 |
| 8 | 10 | 25 | 5 | 1 | 59 | 100 | 20 | 0.30 |

Additional examples of starch-based compositions can be reviewed in the incorporated reference. Furthermore, "prophetic" examples of fiber-reinforced starch-based compositions and their predicted properties can be obtained by substituting fibers for a portion of the components within the compositions exemplified in the incorporated reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing a molded article comprising a dried thermoplastic starch-based and fiber-reinforced composition having homogeneously dispersed fibers,
   wherein
   the dried thermoplastic starch-based and fiber-reinforced composition having homogeneously dispersed fibers is prepared according to a method comprising:
   mixing water, fibers, and gelatinized starch under high shear in order to yield a fibrous mixture having a substantially homogeneous fiber distribution; and
   introducing additional components into the fibrous mixture after the fibers have been homogeneously distributed, wherein the introducing additional components includes:
   mixing non-gelatinized starch into the fibrous mixture;
   mixing a non-volatile plasticizer into the fibrous mixture so as to plasticize at least one of the gelatinized starch or non-gelatinized starch; and
   mixing a water-resistant polymer into the fibrous mixture so that the plasticized starch is capable of behaving in a thermoplastic manner, thereby forming a thermoplastic starch based and fiber reinforced composition having homogeneously dispersed fibers
   pelletizing the thermoplastic starch-based and fiber-reinforced composition having homogeneously dispersed fibers
   drying the pelletized thermoplastic starch based and fiber reinforced composition to remove the water, thereby providing the dried thermoplastic starch-based and fiber-reinforced composition having homogeneously dispersed fibers in the form of non-expanded pellets
   introducing the non-expanded pellets into an injection mold; and
   injection-molding the dried thermoplastic starch-based and fiber-reinforced composition having homogeneously dispersed fibers into an molded article.

2. A method of manufacturing an expanded article from an extrudate comprised of a dried thermoplastic starch-based and fiber-reinforced composition having homogeneously dispersed fibers, the method comprising:
   introducing at least one of a non-pelleted dried thermoplastic starch-based and fiber-reinforced composition having homogeneously dispersed fibers, non-expanded pellets comprised of a dried thermoplastic starch-based and fiber-reinforced composition having homogeneously dispersed fibers, dry pellets comprised of a dried thermoplastic starch-based and fiber-reinforced composition having homogeneously dispersed fibers, or expandable pellets comprised of a dried thermoplastic starch-based and fiber-reinforced composition having homogeneously dispersed fibers, into an extruder so as to be mixed into an extrudable composition;
   extruding the extrudable composition to form an extrudate;
   shaping the extrudate to have the shape of a rod, sheet, or pellet, wherein the extrudate is expanded upon being extruded;
   re-hydrateding the extrudate with a volatile blowing agent to provide a re-hydrated extrudate having a moisture content in a range of about 4% to about 30% by wet weight so that the re-hydrated extrudate is expandable when rapidly heated to a temperature of about 80° C. to about 240° C.
   heating the re-hydrated extrudate having an original volume at a rapid rate so as to cause the volatile blowing agent to vaporize and expand in volume within 30 seconds; and
   expanding the fiber-reinforced starch-based composition to a final volume at least about 2-times larger than the original volume.

3. The method of claim 2, wherein the heating and expanding is performed in a mold so as to form a molded article.

4. The method as in claim 3, wherein the heating and expanding is performed by a system that includes a mold designed to be used with a polystyrene composition.

* * * * *